INVENTOR.
WARREN B. SAUFFERER
BY
Merchant & Gould
ATTORNEYS

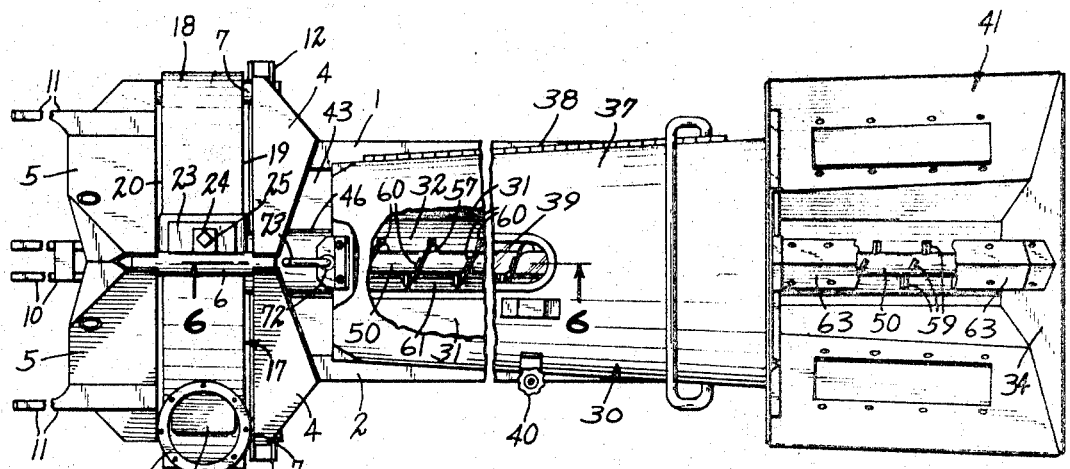
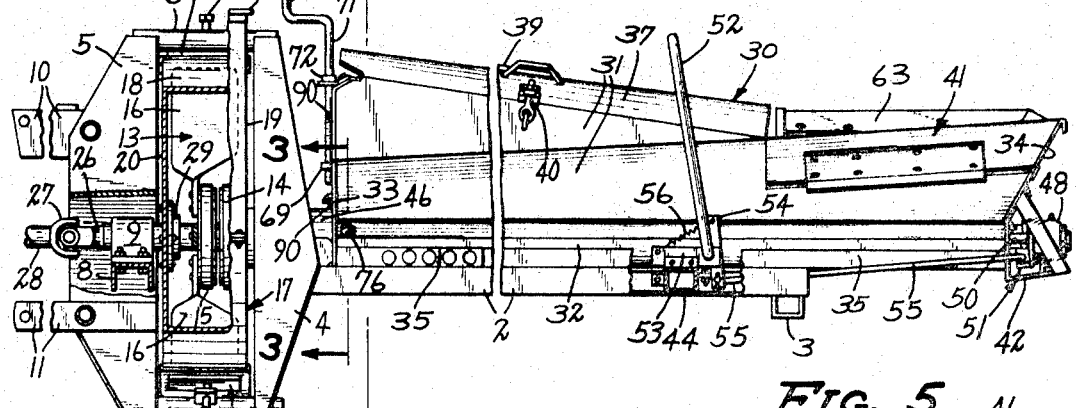
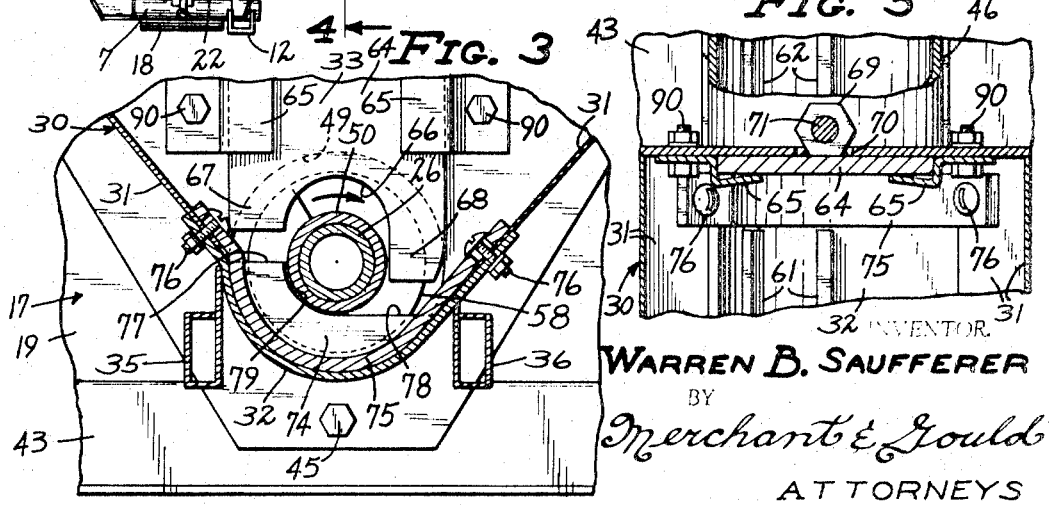

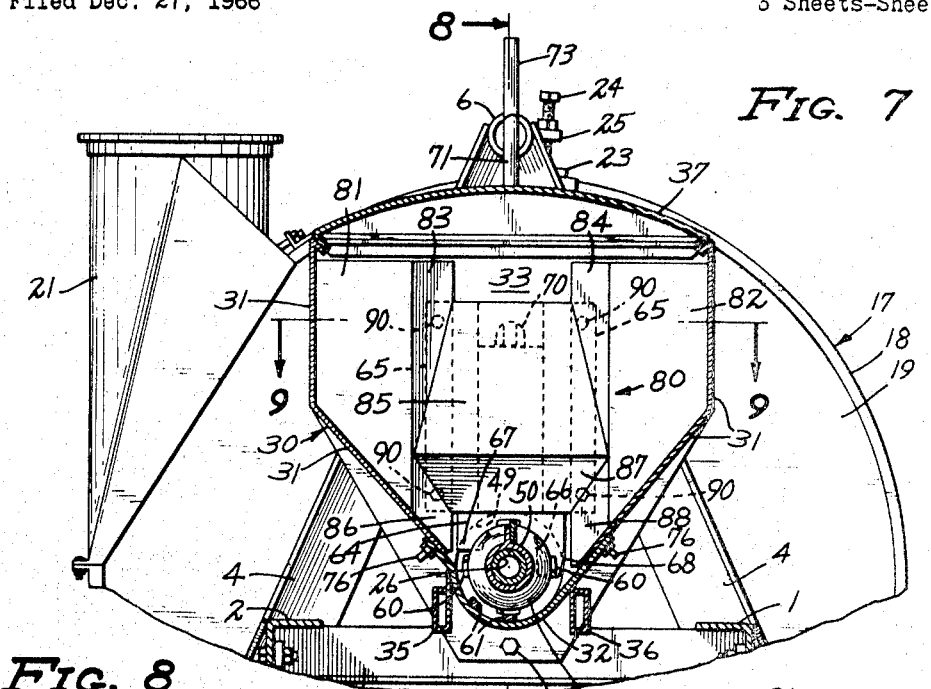
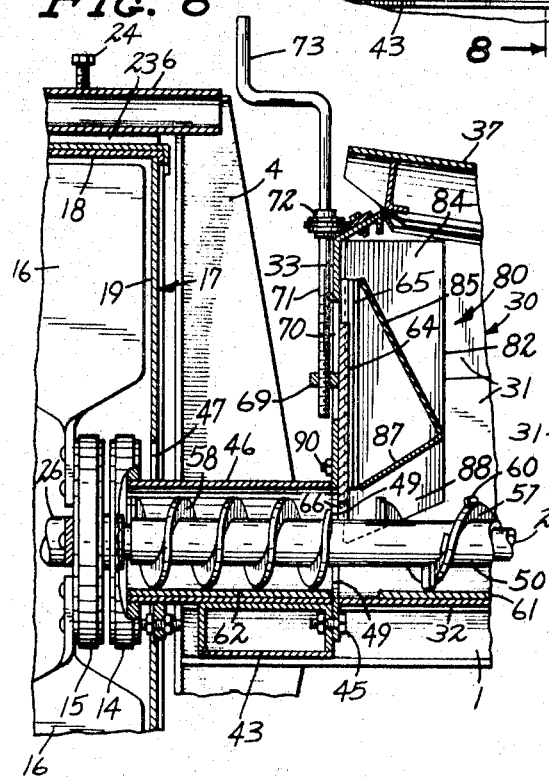
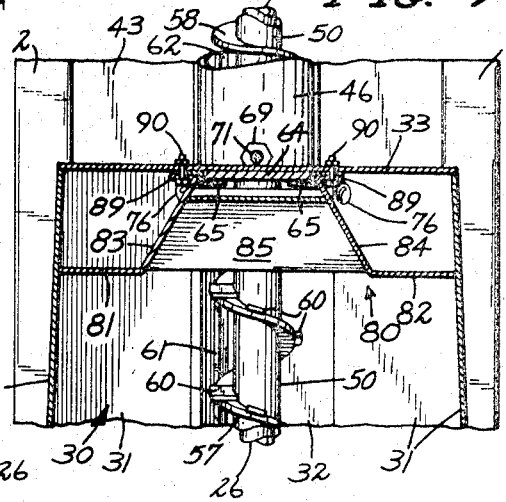

United States Patent Office 3,466,100
Patented Sept. 9, 1969

3,466,100
PORTABLE FEED MILLS AND THE LIKE
Warren B. Saufferer, Hopkins, Minn., assignor to Farmhand, Inc., Hopkins, Minn., a corporation of Delaware
Filed Dec. 27, 1966, Ser. No. 604,727
Int. Cl. B02c 13/10, 23/02; B02b 5/02
U.S. Cl. 241—163                    5 Claims

ABSTRACT OF THE DISCLOSURE

A portable mill for animal feed having a feed auger equipped trough and a rotary feed grinding mill disposed to receive material from the trough. An adjustable flow gate and a cooperating baffle element control the rate of feed from the trough to the grinding mill, and a removable funnel element aids in directing feed to the grinding mill.

---

More specifically, the present invention involves an elongated feedtrough having a cross sectionally arcuate bottom portion, side wall portions and end walls, and a conveyor in the nature of an auger shaft having a helical auger flight extending longitudinally of the arcuate bottom portion of the trough. One of the end walls defines a discharge opening, through which the auger shaft extends, and has mounted thereon a plate-like flow gate for limited movements toward and away from the auger shaft to vary the effective size of the discharge opening. A feed tube extends axially from the discharge opening to grinding means involving a pair of cooperating burr plates in a housing, the auger shaft extending through the feed tube into said housing, the auger shaft having a second auger flight in the feed tube terminating at opposite ends adjacent said opening and burr plates respectively.

Cooperating with the flow gate to control feeding material to the grinding mill is a baffle element removably secured to the bottom portion of the trough adjacent the discharge opening, and a funnel element removably secured to the end wall of the trough adjacent the discharge opening. The baffle and funnel elements are used selectively, depending upon the nature of the material to be delivered to the burr plates.

Further, the present invention involves cooperating primary grinding elements on the auger shaft and feed trough bottom portion, and supporting frame structure whereby the feed mill may be easily transported from place to place by a tractor or the like and lowered to the ground for operation from the power take-off mechanism of a tractor.

An important object of this invention is the provision of flow control means which can be quickly and easily adjusted to regulate the rate of feed of various materials to the grinding elements of a mill, as set forth.

Another object of this invention is the provision of flow control elements which can be used selectively with a flow control gate to effect accurate feeding rate of materials of different densities and particle sizes.

Another object of this invention is the provision of a feed mill which is light in weight, extremely rigid in construction, and durable in use.

The above, and still further highly important objects and advantages of this invention will become apparent from the following detailed specification, appended claims and attached drawings.

Referring to the drawings, in which like reference characters indicate like parts throughout the several views:

FIG. 1 is a view in top plan of a feed mill produced in accordance with this invention, some parts being broken away;

FIG. 2 is a view in side elevation, some parts being broken away and some parts being shown in section;

FIG. 3 is an enlarged fragmentary transverse section, taken on the line 3—3 of FIG. 2;

FIG. 5 is a further enlarged fragmentary horizontal section taken substantially on the line 5—5 of FIG. 4;

FIG. 7 is a view corresponding to FIG. 4, but showing one of the control elements of this invention removed, and another control element substituted therefor;

FIG. 8 is a longitudinal section taken substantially on the line 8—8 of FIG. 7; and FIG. 9 is a horizontal section taken substantially on the line 9—9 of FIG. 7.

Figure 4:
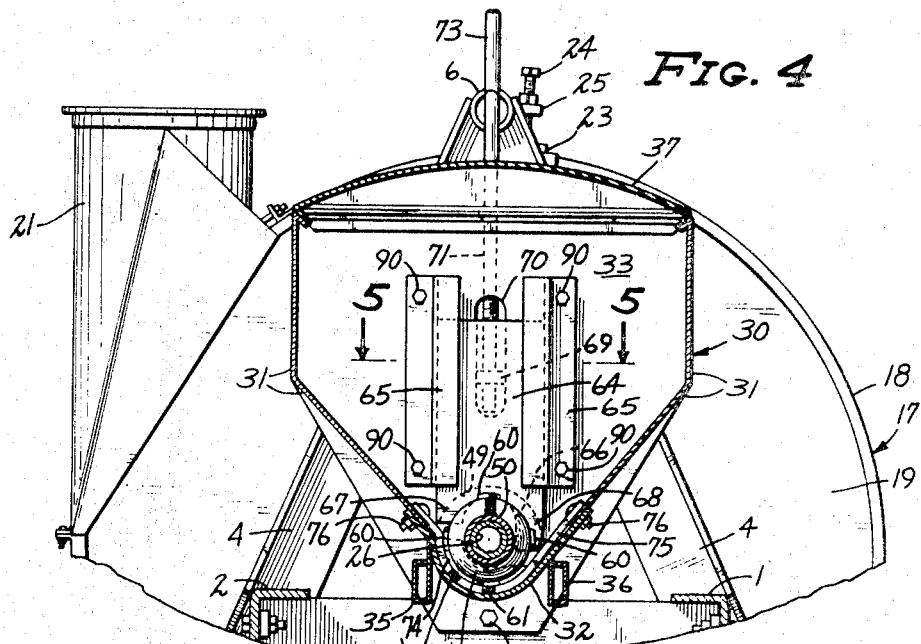
FIG. 4 is an enlarged fragmentary transverse section, taken substantially on the line 4—4 of FIG. 2.

In the embodiment of the invention illustrated, a supporting frame structure is shown as comprising a pair of laterally spaced parallel channel-like frame rails 1 and 2 that are connected at their rear ends by a cross channel 3, the front ends of the rails 1 and 2 being welded or otherwise secured to an inverted V-shaped intermediate frame 4 that is rigidly anchored to an outer end frame 5 by an upper longitudinallly extending tubular frame member 6 and a pair of laterally spaced lower tubular frame members 7. The outer frame 5 includes a cross frame member 8 on which is mounted a bearing 9, the frame members 6 and 7 being welded or otherwise rigidly secured to the intermediate and outer frames 4 and 5. A bifurcated upper coupling member 10 and a pair of laterally spaced lower coupling members 11 are rigidly secured to the outer frame 5, and are adapted to be operatively connected to the conventional three-point hitch of a tractor or like prime mover, not shown. The intermediate frame 4 further includes a pair of ground-engaging supporting channels or feet 12, see particularly FIGS. 1 and 2.

A grinding mill and blower 13 is mounted between the frames 4 and 5, and comprises a pair of cooperating stationary and rotary annular plate-like burrs 14 and 15 respectively, and a plurality of fan blades 16 projecting radially from the rotary burr plate 15. The burr plates 14 and 15 and fan blades 16 are disposed within a housing 17 which comprises a generally cylindrical wall 18 and inner and outer side walls 19 and 20 respectively, the cylindrical wall 18 having mounted thereon a discharge outlet fitting 21. The housing 17 is supported by adjustable supporting pads 22, one of which is shown in FIG. 2, associated with the frame members 7, and a third adjustable pad 23 at the top portion of the housing 17. The pad 23 operates as a clamping member and is engaged by a clamping screw or the like 24, that is screw threaded in a suitable opening in an ear or lug 25 that is welded or otherwise rigidly secured to the tubular frame member 6. Loosening of the clamping screw 24 permits the housing 17 to be rotated on the axis of the burr plates 14 and 15 to angularly adjust the position of the discharge outlet fitting 21. The rotary burr plate 15 and fan blades 16 are mounted on a drive shaft 26 that is journalled in the bearing 9 and on which is mounted a conventional universal joint 27 at the end of a drive shaft extension 28 that is adapted to be connected to the power take-off of a tractor or the like, not shown, but in the usual manner. The shaft 26 extends into the interior of the housing 17 through a conventional annular sealing element 29 mounted on the outer side or end wall 20 of the housing 17, see FIG. 2.

An elongated feed trough 30 extends longitudinally of the frame rails 1 and 2, and comprises a pair of laterally spaced side wall portions 31, an arcuate bottom wall portion 32, and front and rear walls 33 and 34 respectively. At its bottom portion, the trough 30 is reinforced by a pair of laterally spaced longitudinally extending box frame members 35 and 36. For the greater part of its length rearwardly of the front wall 33, the feed trough 30 is covered by a lid 37 hinged to the upper edge of one of the side wall portions 31, as indicated at 38, and provided with a viewing window 39, see FIG. 1. The lid 37 is releasably held in place by a conventional screw-type latch 40. Rearwardly of the lid 37, the side wall portions 31 are shaped to provide an open-topped hopper 41 for reception of feed or other material to be processed in the machine. A support bracket 42 is welded or otherwise rigidly secured to the rear wall 34 and the rear ends of the frame members 35, 36, the bracket 42 being adapted to rest upon the ground with the cross channel 3 and feet 12. The cross channel 3, feet 12 and support bracket 42 are shown at different levels in FIG. 2, with the hopper 30 and supporting structure horizontally disposed, for convenience only. In the operating position on the ground, the frame structure including the frame rails 1 and 2 and hopper 30 will slope upwardly from the rear end wall 34 toward the intermediate and front or outer frames 4 and 5 respectively. The hopper 30 is supported on the frame rails 1 and 2 by cross-sectionally rectangular supporting tubes 43 and 44 which have their opposite ends received within the channel-like frame rails 1 and 2. The lower end of the front wall 33 of the feed trough 30 is bolted or otherwise rigidly secured to the intermediate portion of the supporting tube 43, as indicated at 45, the supporting tube 44 being rigidly secured to the bottom wall trough portion 32 by suitable means, not shown.

The drive shaft 26 extends rearwardly through a central opening in the stationary burr plate 14 and axially through a feed tube 46 that extends between the front feed trough wall 33 and the burr plate 14 through an opening 47 in the inner wall 19 of the housing 17. The drive shaft 26 extends rearwardly through a suitable opening in the rear wall 34 and is journalled in a bearing 48 mounted on the support bracket 42, the drive shaft 26 being coaxial with the arcuate bottom wall portion 32. Further, the drive shaft 26 extends through a discharge opening 49 in the front wall 33, the discharge opening 49 being aligned with the feed tube 46. The stationary burr plate 14 is mounted on the front end of the feed tube 46 in conventional and well known manner.

An elongated tubular auger shaft 50 is concentrically mounted on the drive shaft 26 and, rearwardly of the rear wall 34, is operatively connected to the rear end portion of the drive shaft 26 by a conventional plate-type clutch mechanism 51. The clutch mechanism 51 is operated by a bail-like lever 52 pivotally mounted on bracket means 53 on the supporting tube 44, a second lever 54 operatively connected to the operating lever 52, and a rigid link 55 connected at one end to the second lever 54 and at its other end to the clutch mechanism 51. A coil tension spring 56 connected to the second lever 54 and bracket means 53, yieldingly urges the operating lever 52, second lever 54 and link 55 in a direction to operatively couple the drive shaft 26 with the tubular auger shaft 50. A helical feeding flight 57 is fixedly mounted on the auger shaft 50 for common rotation therewith, and extends from the hopper 41 to a point closely adjacent the front wall 33 of the feed trough 30. A second helical auger flight 58 on the auger shaft 50 extends from the discharge opening 49 to the stationary burr plate 14, the axial pitch of the second flight 58 being substantially shorter than that of the auger flight 57. A plurality of axially and circumferentially spaced cutting elements 59 extend radially outwardly from the auger shaft 50 within the hopper portion 41, and a plurality of other cutting elements 60 are welded or otherwise mounted on the auger flight 57, the cutting elements 60 cooperating with cutting bars 61 secured to the inner surface of the arcuate bottom portion 32 and extending longitudinally thereof. Other longitudinally extending bars 62 are mounted on the inner surface of the feed tube 46, at the bottom portion thereof, these together with the bars 61 preventing the material in the feed trough 30 from being carried around in a circular direction by the auger flights 57 and 58, whereby to aid in the feeding of the material toward the burr plates 14 and 15. A baffle element 63 overlies the rear end portion of the auger shaft 50 within the hopper 41, to prevent the cutting elements 59 from impelling relatively coarse material, such as ears of corn or the like, upwardly and outwardly of the hopper 41.

For the purpose of controlling flow of material from the feed trough 30 through the discharge opening 49 and feed tube 46 to the burr plates 14 and 15, a plate-like flow gate 64 is mounted against the inner surface of the end wall 33 in overlying relationship to the auger shaft 50, by a pair of laterally spaced vertical guide members 65 that are bolted or otherwise rigidly secured to the end wall 33. The lower end of the flow gate 64 is notched, as indicated at 66, see FIG. 3, to define a pair of laterally spaced legs 67 and 68 that are adapted to straddle the adjacent portion of the auger shaft 50 intermediate the adjacent ends of the auger flights 57 and 58. A nut element 69 is welded or otherwise rigidly secured to the flow gate 64 and projects outwardly through an elongated slot 70 in the end wall 33, the nut 69 having screw threaded therein a vertically disposed elongated screw element 71 that is journalled in a bearing 72 bolted or otherwise rigidly secured to the upper end portion of the end wall 33. The upper end of the screw element 71 is formed to provide a crank 73 by means of which the screw element 71 may be rotated to raise and lower the flow gate 64 relative to the auger shaft 50 and the arcuate bottom portion 32 of the feed trough 30. As shown, the notch 66 is generally U-shaped to closely encompass the auger shaft 50 when the flow gate 64 is lowered, the gate 64 being of a width substantially equal to the diameter of the discharge opening 49, whereby to effectively increase or decrease the discharge aperture between the trough 30 and feed tube 46 responsive to raising and lowering of the flow gate 64.

Figure 6:
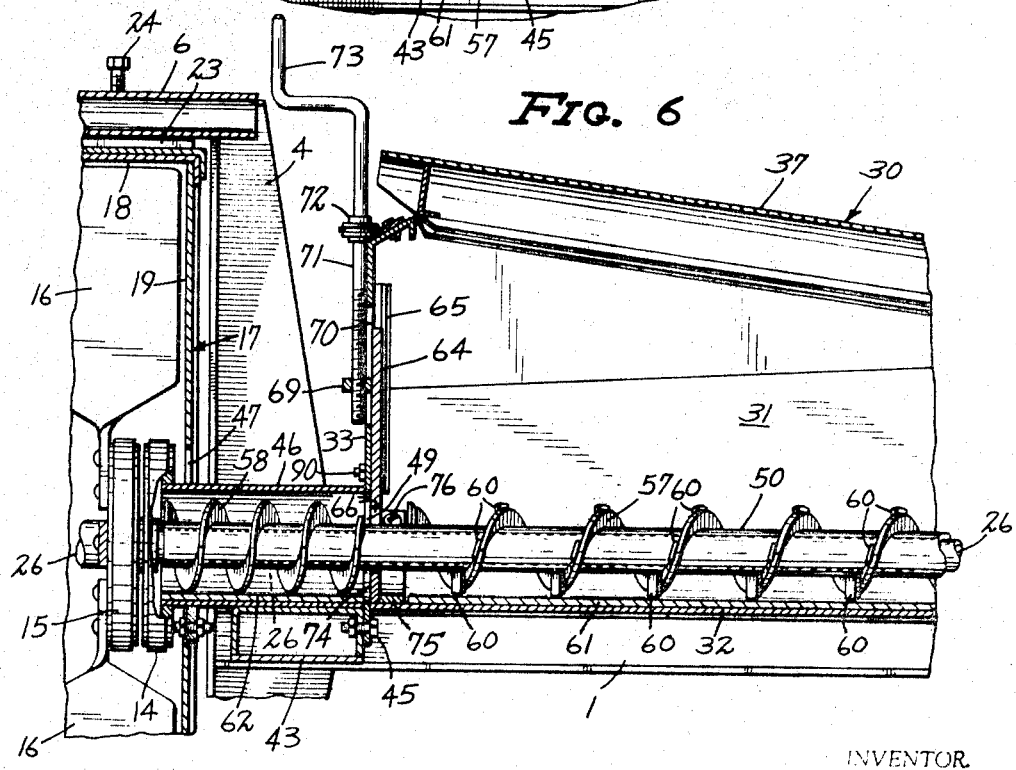
FIG. 6 is an enlarged fragmentary longitudinal section taken on the line 6—6 of FIG. 1.

A baffle element 74 cooperates with the flow gate 64 to control the delivery of material from the feed trough 30 to the burr plates 14 and 15, the baffle element 74 being provided with a mounting flange 75 that is removably secured to the arcuate bottom portion 32 by nut-equipped screws or the like 76, see FIGS. 3-6. The baffle element 74 underlies the flow gate 64 and has an upper edge comprising one generally horizontal edge portion 77 that extends in a direction radially from the axis of the auger shaft 50 and underlies the leg 67 of the flow gate 64, a second horizontally disposed edge portion 78 that extends generally tangentially with respect to the bottom portion of the auger shaft 50 and underlies the flow gate leg 68, and an arcuate edge portion 79 concentric with the auger shaft 50 and joining the edge portions 77 and 78, see particularly FIG. 3. The baffle element 74 cooperates with the flow gate 64 to provide a discharge aperture which may be quickly and easily varied in size to accommodate various materials and to adapt the machine to the power output of tractors or the like of various horse power. As shown in FIG. 3, the auger shaft 50 with its auger flights 57 and 58, rotates in a clockwise direction, tending to deliver the material fed thereby toward the upper horizontal edge portion 77 of the baffle 74, whereby to discourage delivery of heavier particles of foreign matter, such as stones or the like to the burr plates 14 and 15. Further, the baffle element 74 and flow gate 64 cooperate to prevent delivery of stones of such relatively large size that might injure the burr plates 14 and 15.

It will be appreciated that the cutting elements 59, 60 and 61 cooperate to reduce particle sizes of the material as it is conveyed to the burrs 14 and 15, the burrs further reducing the particles to the desired size. The machine is used to process material of low density, such as dry corncobs or very dry corn, the primary cutting action of the elements 59, 60 and 61 results in an appreciable quantity of light, fluffy chaff within the trough 30. In order to enhance the feeding of such lightweight material through the discharge opening 49 and feed tube 46, a funnel element 80 is secured adjacent the end wall 33 of the feed trough 30. The funnel element 80 is preferably made from sheet metal, and is formed to provide auxiliary end wall portions 81-85 that are longitudinally inwardly spaced from the trough end wall 33, and guide wall portions 86, 87 and 88 that coverage from the common plane of the end wall portions 81 and 82 toward the discharge opening 49. The funnel element 80 is provided with a pair of mounting flanges 89 which overlie portions of the flow gate guide members 65, the flanges 89 having suitable apertures for reception of the nut-equipped screws 90 that are normally used to mount the guide members 65 on the end wall 33, whereby the funnel element 80 is securely but releasably mounted in place.

It will be appreciated that, when the funnel element 80 is to be used, the baffle element 74 is removed, so as to permit free passage of the light, fluffy material through the discharge opening 49. As the material is advanced toward the discharge opening 49, it becomes wedged or compressed between the guide walls 86-88 and the underlying arcuate bottom portion 32, so that a maximum load of the light, fluffy material may be fed to the plates 14 and 15. It will be further noted that the flow gate 64 is used in cooperation with the funnel element 80 to accurately control the rate of feed of material through the discharge opening 49. Thus, the rate of feed of lightweight material may be also controlled in accordance with the amount of power available to operate the machine.

From the above, it will be appreciated that, with the selective use of the baffle elements 74 and funnel element 80, the above described machine is capable of efficiently handling various types of feed material even when driven by driving means of various output power. The machine is sufficiently light in weight that it may be easily transported from place to place. Further, when the same is resting upon the ground in position to operate, the housing 17 may be quickly and easily adjusted to properly position the discharge fitting 21 for efficient delivery of material to the desired point.

What is claimed is:
1. A feed mill comprising:
   (a) an elongated feeding trough having side walls, an arcuate bottom wall portion, and end walls;
   (b) a housing outwardly of one of said end walls;
   (c) grinding means in said housing;
   (d) a relatively large diameter discharge opening in said one of the end walls for delivery of material to said grinding means,
   (e) a relatively small diameter auger shaft disposed in upwardly spaced parallel relation to said bottom wall portion and extending through said opening substantially concentric therewith;
   (f) a helical auger flight on the auger shaft within said trough and having a discharge end disposed in closely inwardly spaced relation to said one end wall;
   (g) a flow gate for controlling discharge of material through said opening;
   (h) means mounting said flow gate on said one end wall for limited movements toward and away from said auger shaft;
   (i) means for imparting said movement to said flow gate and for holding said flow gate in desired set positions of movement thereof;
   (j) and a funnel element mounted adjacent said one end wall within said trough and having funnel wall portions converging toward said discharge opening.
2. A feed mill comprising:

(a) an elongated feeding trough having side walls, an arcuate bottom wall portion, and end walls;
(b) a housing outwardly of one of said end walls;
(c) grinding means in said housing;
(d) a relatively large diameter discharge opening in said one of the end walls for delivery of material to said grinding means;
(e) a relatively small diameter auger shaft disposed in upwardly spaced parallel relation to said bottom wall portion and extending through said opening substantially concentric therewith;
(f) a helical auger flight on the auger shaft within said trough and having a discharge end disposed in closely inwardly spaced relation to said one end wall;
(g) a flow gate for controlling discharge of material through said opening;
(h) means mounting said flow gate on said one end wall for limited movements toward and away from said auger shaft;
(i) said flow gate having a lower edge including a pair of laterally spaced generally horizontal edge portions one disposed at a higher level than the other thereof and an intermediate lower edge portion shaped to partially encompass said auger shaft in axially spaced relation to said uger flight, when the flow gate is moved to one limit of said movements thereof;
(j) and a baffle element disposed in said arcuate bottom portion in underlying relation to said flow gate and having an arcuate intermediate upper edge portion concentric to said auger shaft, and generally horizontal upper edge portions one of which projects radially in one direction relative to said auger shaft at a relatively high level and the other of which projects tangentially from said arcuate edge portion in the opposite direction at a relatively low level, said radially and tangentially projecting edge portions underlying the higher and lower edge portions respectively of said flow gate, the arrangement being such that material in the hopper is urged generally circumferentially upwardly toward said radially projecting baffle edge responsive to rotation of said auger shaft in a direction to move the material toward said grinding means.

3. The feed mill defined in claim 2 characterized by a funnel element releasably mounted on said one end wall within said trough, said funnel element having funnel wall portions converging toward said discharge opening.

4. The feed mill defined in claim 2, characterized by a feed tube substantially concentric with said auger shaft and extending axially from said one end wall into said housing, and a second helical auger flight on said auger shaft within said feed tube, said second auger flight having opposite ends disposed closely adjacent said discharge opening and grinding means respectively.

5. The feed mill defined in claim 4 characterized by cooperating cutting elements on said first-mentioned auger flight and said arcuate bottom portion, said second auger flight having a shorter pitch than said first-mentioned auger flight.

References Cited

UNITED STATES PATENTS

| 1,723,615 | 8/1929 | Hamlin | 241—186 X |
| 1,794,326 | 2/1931 | Sierer | 222—413 |
| 2,314,706 | 3/1943 | Johnston | 241—247 |
| 2,467,691 | 4/1949 | Pendergast | 241—247 |
| 2,630,905 | 3/1953 | Howe | 198—64 X |
| 2,647,694 | 8/1953 | Williams | 241—152 X |
| 2,701,595 | 2/1955 | Berger | 241—186 X |
| 2,851,173 | 9/1958 | Morrison | 198—64 |
| 3,059,862 | 10/1962 | Rich | 241—152 |

ROBERT C. RIORDON, Primary Examiner

D. G. KELLY, Assistant Examiner